United States Patent
Shiotsuki et al.

(10) Patent No.: US 8,553,550 B2
(45) Date of Patent: Oct. 8, 2013

(54) WIRELESS TRANSMISSION DEVICE, WIRELESS TRANSMISSION METHOD, PROGRAM, AND INTEGRATED CIRCUIT

(75) Inventors: Akihiko Shiotsuki, Osaka (JP); Koichiro Tanaka, Hyogo (JP)

(73) Assignee: Panasonic Corporation, Osaka (JP)

(*) Notice: Subject to any disclaimer, the term of this patent is extended or adjusted under 35 U.S.C. 154(b) by 237 days.

(21) Appl. No.: 13/061,406

(22) PCT Filed: Aug. 26, 2009

(86) PCT No.: PCT/JP2009/004115
§ 371 (c)(1),
(2), (4) Date: Feb. 28, 2011

(87) PCT Pub. No.: WO2010/023890
PCT Pub. Date: Mar. 4, 2010

(65) Prior Publication Data
US 2011/0176420 A1 Jul. 21, 2011

(30) Foreign Application Priority Data
Aug. 28, 2008 (JP) ................................. 2008-219146

(51) Int. Cl.
*G01R 31/08* (2006.01)
(52) U.S. Cl.
USPC ........................................ 370/235; 370/230.1
(58) Field of Classification Search
USPC ............................................ 370/252, 235, 328
See application file for complete search history.

(56) References Cited

U.S. PATENT DOCUMENTS

| | | | | |
|---|---|---|---|---|
| 4,672,543 A * | 6/1987 | Matsui et al. | ................ | 709/235 |
| 4,839,891 A * | 6/1989 | Kobayashi et al. | ........... | 370/231 |
| 5,630,154 A * | 5/1997 | Bolstad et al. | ................. | 712/19 |
| 5,721,733 A * | 2/1998 | Wang et al. | .................... | 370/332 |
| 6,282,172 B1 * | 8/2001 | Robles et al. | ................. | 370/230 |
| 2002/0032031 A1 * | 3/2002 | Ogino et al. | ................. | 455/435 |
| 2002/0059592 A1 * | 5/2002 | Kiraly | ............... | 725/37 |
| 2002/0068588 A1 * | 6/2002 | Yoshida et al. | .............. | 455/461 |
| 2003/0156544 A1 * | 8/2003 | Ido | ................................ | 370/241 |
| 2005/0152315 A1 | 7/2005 | Ishidoshiro | | |
| 2005/0207417 A1 * | 9/2005 | Ogawa et al. | ................. | 370/390 |
| 2005/0245298 A1 | 11/2005 | Mori | | |

(Continued)

FOREIGN PATENT DOCUMENTS

| | | |
|---|---|---|
| JP | 2002-325074 | 11/2002 |
| JP | 2003-264419 | 9/2003 |

(Continued)

OTHER PUBLICATIONS

International Search Report issued Nov. 17, 2009 in corresponding International Application No. PCT/JP2009/004115.

(Continued)

*Primary Examiner* — Hassan Phillips
*Assistant Examiner* — Siren Wei
(74) *Attorney, Agent, or Firm* — Wenderoth, Lind & Ponack, L.L.P.

(57) ABSTRACT

A wireless transmission device includes a wireless transmitting and receiving unit having an antenna that transmits and receives data wirelessly; a Transmission Control Protocol (TCP) buffer in which the data that is to be transmitted and has been received by the wireless transmitting and receiving unit is temporarily stored; and an antenna control unit that controls the wireless transmitting and receiving unit to improve communication quality of the antenna, when it is determined that a data amount stored in the TCP buffer falls below a threshold value.

3 Claims, 14 Drawing Sheets

(56) References Cited

U.S. PATENT DOCUMENTS

2006/0133278 A1* 6/2006 Hill et al. .................. 370/235
2007/0033305 A1* 2/2007 Malaviya ..................... 710/52

FOREIGN PATENT DOCUMENTS

| JP | 2005-167772 | 6/2005 |
|---|---|---|
| JP | 2005-203947 | 7/2005 |
| JP | 2006-254266 | 9/2006 |
| JP | 2008-61080 | 3/2008 |
| JP | 2008-167079 | 7/2008 |
| WO | 2008/090980 | 7/2008 |

OTHER PUBLICATIONS

Abstract and full English machine translation of previously cited JP2008-061080 dated Mar. 13, 2008.

* cited by examiner

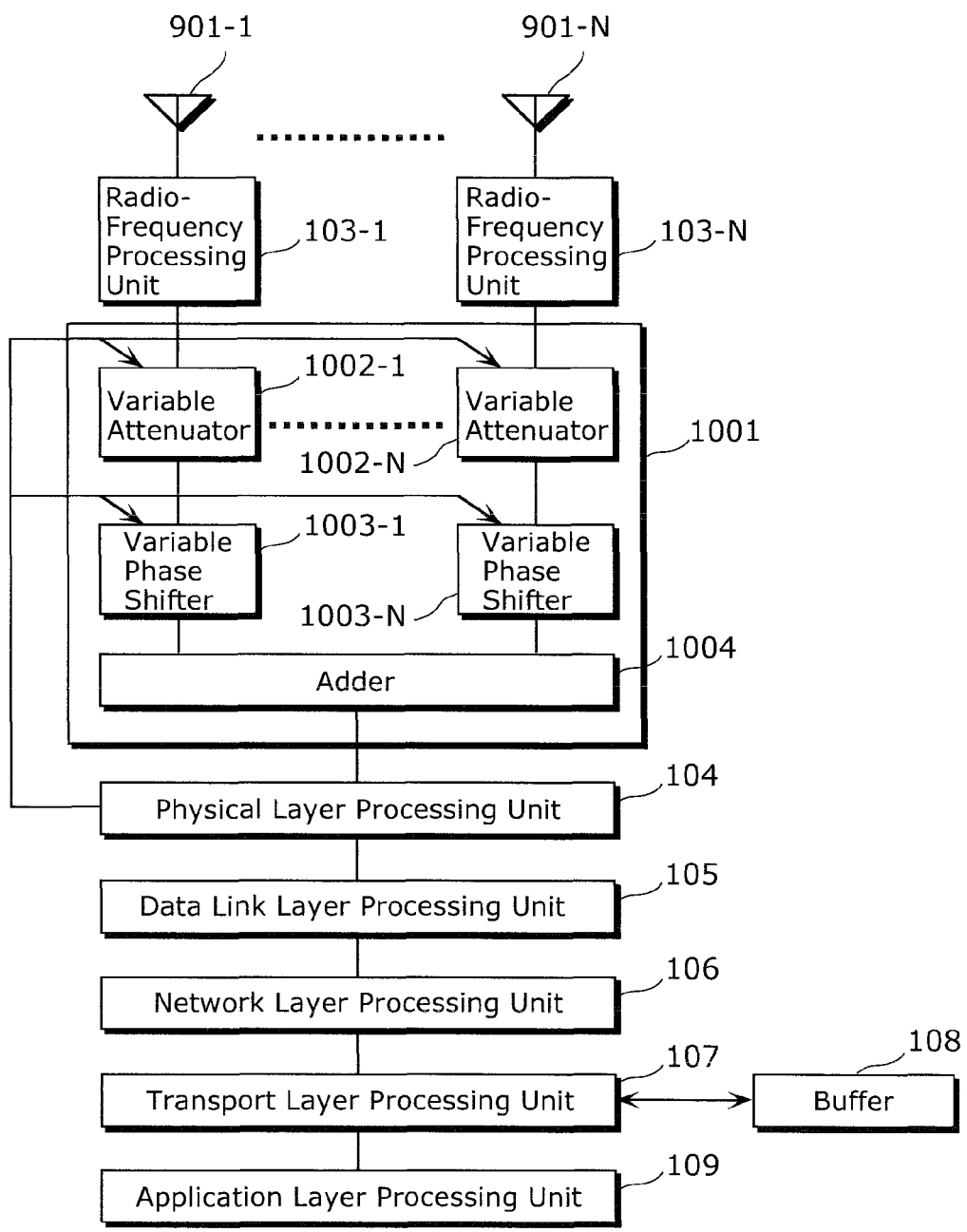

WIRELESS TRANSMISSION DEVICE, WIRELESS TRANSMISSION METHOD, PROGRAM, AND INTEGRATED CIRCUIT

BACKGROUND OF INVENTION

1. Technical Field

The present invention relates to a method of controlling a controllable antenna included in a wireless transmission device, so as to enable the wireless transmission device to perform stable data transmission (transmitting and receiving) of application data depending on radio wave propagation environments.

2. Background Art

In a network configuration connecting information terminals to one another, wireless transmission devices have advantages of a terminal portability and a placement flexibility higher than those of wired transmission devices, and advantages of weight reduction without using wired cables, for example. The advantages allow the wireless transmission devices to be presently provided in various home appliances to transmit video and audio, in addition to conventional use in data transmission for personal computers.

While the wireless transmission devices have the above-described advantages, they also have disadvantages. The wireless transmission devices perform communication by emitting electromagnetic waves into space. Thereby, in space where many reflecting objects are placed, the transmission characteristics of the wireless transmission devices are often deteriorated due to influence of fading phenomenon caused by radio waves (delayed waves) propagated after having been reflected on the objects. In order to reduce the influence, there are methods including various diversity methods, methods of performing directional control on an antenna, methods employing an adaptive array antenna for weighting signals in signal processing, and the like.

FIG. 13 is a block diagram of a wireless transmission device that controls antennas using a so-called spatial diversity method. In the spatial diversity method, a plurality of antennas 901-1 to 901-N are arranged to be uncorrelated to one another as much as possible. Signals received by the antennas 901-1 to 901-N are provided to a radio-frequency switch 902. The radio-frequency switch 902 selects a single signal sequence from a plurality of input signal sequences, and provides the selected one to a radio-frequency processing unit 103. As a method for the selection, it is well known that signal levels of the plurality of signal sequences, or pieces of information such as a Bit Error Rate (BER) that are feedback from a physical layer processing unit 104 as described in Patent Reference 1, are compared to one another, so that a signal sequence having a maximum or minimum signal level (or information) is switched to be output. In addition, pieces of information that are feedback from a data link layer processing unit 105 are also used to select a signal sequence.

As shown in FIG. 13, the upper processing blocks including the physical layer processing unit 104 are standardized by a seven-layer model of Open Systems Interconnection (OSI). In packet communications via the Internet, five protocols of the physical layer, the data link layer, the network layer, the transport layer, and the application layer among the seven-layers are often used. Furthermore, as shown in FIG. 13, a transport layer processing unit 107 includes a buffer 108.

There is also a maximum ratio combining method as shown in FIG. 14, by which variable attenuators 1002-1 to 1002-N and variable phase shifters 1003-1 to 1003-N adjust amplitudes and phases, respectively, of the plurality of signal sequences to maximize a Signal to Noise power Ratio (SNR) of signals output from a weighting synthesis unit 1001 to the physical layer processing unit 104, and then an adder 1004 synthesizes the plurality of signal sequences.

In the maximum ratio combining method, weighting is performed depending on the amplitudes and the phases so that a synthesized directionality pattern generated by signal processing is, for example, null in a direction to which interference waves are propagated. Here, a device that temporally changes weight coefficients in accordance with radio wave propagation environments is called an adaptive array antenna Patent Reference 2 discloses an antenna that includes a plurality of parasite elements in each of which a matched load is connected around a radiation element. By switching the matched load ON or OFF, a directionality of the antenna element is physically changed to optimize a parameter such as a Signal to Interference power Ratio (SIR). Thereby, the antenna performs control for deciding a combination of ON/OFF of a plurality of the matched loads.

While in the above methods the antenna control is performed based on indexes obtained in the physical layer or the data link layer, a method disclosed in Patent Reference 3 performs antenna control based on data throughput in the application layer.

Each of the methods attempts to control an antenna to be in an optimum transmitting/receiving state in accordance with radio wave propagation environments.

PRIOR ARTS

Patent References

Patent Reference 1: Japanese Unexamined Patent Application Publication No. 2005-203947
Patent Reference 2: Japanese Unexamined Patent Application Publication No. 2003-264419
Patent Reference 3: Japanese Unexamined Patent Application Publication No. 2005-167772

SUMMARY OF INVENTION

Although there are various methods including the above-described control methods for controlling an antenna device to receive signals in accordance with radio wave propagation environments, these methods have the following problems.

Each of the antenna control methods disclosed in Patent References 1 and 2 is performed based on information related to the physical layer or the data link layer. In wireless transmission, it is often observed that the physical layer and the data link layer have rapid and temporary fluctuations. For example, a Received Signal Strength Indicator (RSSI) is always fluctuated even in static radio wave propagation environments where a human or an object is not moved. Furthermore, processing delay occurred in each layer would cause a rapid change in the number of received packets, which increases an error rate.

If such fluctuation occurs instantly or temporarily, information accumulated in the upper layer in a system, such as the transport layer or the application layer, or in an internal buffer can be reproduced to secure stable communications in the system. However, the antenna control methods performed based only on information of the physical layer or the data link layer attempt to secure stable communications by controlling an antenna even for an instant propagation change. Therefore, on the contrary, such unnecessary antenna control causes the system to be in an unstable communication state.

On the other hand, the antenna control method disclosed in Patent Reference 3 is performed based on data throughput in the application layer. However, in the case of video contents, the data throughput is almost constant, which sometimes prevents the control. In addition, it is difficult to measure the data throughput itself in the application layer.

Thus, the present invention addresses the above-described problems. It is an object of the present invention to provide a wireless transmission device capable of controlling an antenna, for example, switching between antennas at an appropriate timing.

In accordance with an aspect of the present invention, there is provided a wireless transmission device that performs wireless data transmission, the wireless transmission device including: a wireless transmitting/receiving unit includes an antenna that transmits and receives data wirelessly; a buffer in which the data that is to be transmitted or has been received by the wireless transmitting/receiving unit is temporarily stored; and an antenna control unit configured to control the wireless transmitting/receiving unit to improve communication quality of the antenna, when it is determined that a data amount stored in the buffer falls below a threshold value.

With the above structure, secure stable transmission is achieved by reproducing data in the buffer, without performing control of the wireless transmitting/receiving unit, such as switching between antennas, even if instant fluctuation occurs in radio wave propagation environments. On the other hand, when the fluctuation is continuous due to door opening/closing, position changes, or the like, transmission is performed depending on new propagation environments, by performing antenna switching or the like. As a result, unnecessary antenna switching or the like can be prevented. Especially, it is possible to achieve stable transmission (transmitting and receiving) of contents such as video streams.

It is also possible that the buffer is a Transmission Control Protocol (TCP) buffer in which a TCP packet received by the wireless transmitting/receiving unit is temporarily stored.

It is possible that the wireless transmitting/receiving unit is configured to transmit an ACKnowledgement (ACK) packet to a transmission source of the TCP packet in order to notify the transmission source of that the wireless transmitting/receiving unit has received the TCP packet, and the antenna control unit is configured to detect a data amount of the TCP buffer by subtracting a window size included in the ACK packet from a capacity of the TCP buffer. With the above structure, the data amount is detected using the window size indicated in the TCP header. As a result, existing techniques can be effectively utilized.

It is further possible that the antenna control unit is configured to calculate the threshold value, by multiplying an application rate by a necessary time period, the application rate being a processing amount per unit time of the data received by the wireless transmitting/receiving unit, and the necessary time period being a time period required to change characteristics of the wireless transmitting/receiving unit. With the above structure, even if new data cannot be received in performing antenna switching, it is possible to continue current processing by using data stored in the TCP buffer. As a result, even in the situation where, for example, video data is being received, it is possible to prevent a user from being conscious of control of the wireless transmitting/receiving unit.

It is still further possible that the buffer is an application buffer used for an application program for processing the data received by the wireless transmitting/receiving unit.

It is possible that the wireless transmission device further includes a communication state detection unit configured to detect a communication state of the wireless transmitting/receiving unit, wherein the antenna control unit is configured to change characteristics of the wireless transmitting/receiving unit based on (a) the communication state of the wireless transmitting/receiving unit which is detected by the communication state detection unit and (b) the data amount of the buffer. With the above structure, it is possible to perform antenna switching or the like at a more appropriate timing.

It is still further possible that the antenna control unit is configured to cause the wireless transmitting/receiving unit to perform one of (a) processing for selecting one of a plurality of the antennas serving as the antenna which have different directivities, (b) processing for changing directivities of the antenna by switching a conduction state of a parasitic element arranged close to the antenna, and (c) processing for changing a weighting coefficient for an adaptive array antenna serving as the antenna.

It is still further possible that the antenna control unit is configured to change separately characteristics of the wireless transmitting/receiving unit transmitting data and characteristics of the wireless transmitting/receiving unit receiving data, based on header information of a Transmission Control Protocol (TCP) packet transmitted or received by the wireless transmitting/receiving unit.

It is still further possible that the antenna control unit is configured to change the characteristics of the wireless transmitting/receiving unit receiving data, when the wireless transmitting/receiving unit has not transmitted an ACKnowledgement (ACK) packet for a predetermined time period although the wireless transmitting/receiving unit is in middle of receiving a plurality of the TCP packets included in single data.

It is still further possible that the antenna control unit is configured to change the characteristics of the wireless transmitting/receiving unit receiving data, when the wireless transmitting/receiving unit transmits N pieces of ACKnowledgement (ACK) packets, where N is an integer of 2 or more, which have ACK numbers assigned with identical values in response to N pieces of TCP packets although the wireless transmitting/receiving unit has continuously received the N TCP packets included in single data which have TCP headers indicating sequence numbers assigned with different values.

It is still further possible that the antenna control unit is configured to change the characteristics of the wireless transmitting/receiving unit transmitting data, when (i) the wireless transmitting/receiving unit continuously receives N TCP packets included in single data, where N is an integer of 2 or more, which have TCP headers indicating sequence numbers assigned with identical values, and (ii) the wireless transmitting/receiving unit transmits N ACKnowledgement (ACK) packets having ACK numbers assigned with identical values in response to the N TCP packets.

With the above structure, antenna switching or the like is performed depending on whether the antenna is transmitting data or receiving data. As a result, communication quality is further improved.

In accordance with another aspect of the present invention, there is provided a wireless transmission method performed by a wireless transmission device including a wireless transmitting/receiving unit and a buffer, the wireless transmitting/receiving unit having an antenna that transmits and receives data wirelessly, and the buffer temporarily storing the data that is to be transmitted or has been received by the wireless transmitting/receiving unit. More specifically, the wireless transmission method includes controlling the wireless transmitting/receiving unit to improve communication quality of the antenna, when it is determined that a data amount stored in the buffer falls below a threshold value.

It is still further possible that the controlling includes changing separately characteristics of the wireless transmitting/receiving unit transmitting data and characteristics of the wireless transmitting/receiving unit receiving data, based on header information of a Transmission Control Protocol (TCP) packet transmitted or received by the wireless transmitting/receiving unit.

In accordance with another aspect of the present invention, there is provided a program causing a computer to perform wireless data transmission, the computer including a wireless transmitting/receiving unit and a buffer, the wireless transmitting/receiving unit having an antenna that transmits and receives data wirelessly, and the buffer temporarily storing the data that is to be transmitted or has been received by the wireless transmitting/receiving unit. More specifically, the program causes the computer to execute controlling the wireless transmitting/receiving unit to improve communication quality of the antenna, when it is determined that a data amount stored in the buffer falls below a threshold value.

It is also possible that the controlling includes changing separately characteristics of the wireless transmitting/receiving unit transmitting data and characteristics of the wireless transmitting/receiving unit receiving data, based on header information of a Transmission Control Protocol (TCP) packet transmitted or received by the wireless transmitting/receiving unit.

In accordance with still another aspect of the present invention, there is provided an integrated circuit provided in a wireless transmission device including a wireless transmitting/receiving unit and a buffer, the wireless transmitting/receiving unit having an antenna that transmits and receives data wirelessly, and the buffer temporarily storing the data that is to be transmitted or has been received by the wireless transmitting/receiving unit. More specifically, the integrated circuit includes an antenna control unit configured to control the wireless transmitting/receiving unit to improve communication quality of the antenna, when it is determined that a data amount stored in the buffer falls below a threshold value.

It is also possible that the antenna control unit is configured to change separately characteristics of the wireless transmitting/receiving unit transmitting data and characteristics of the wireless transmitting/receiving unit receiving data, based on header information of a Transmission Control Protocol (TCP) packet transmitted or received by the wireless transmitting/receiving unit.

It should be noted that the present invention can be implemented not only as the wireless transmission device, but also as: an integrated circuit implementing the functions of the wireless transmission device; a program causing a computer to execute the functions; and the like. Of course, the program can be distributed via a recording medium such as a Compact Disc-Read Only Memory (CD-ROM) or via a transmission medium such as the Internet.

According to the present invention, continuous deterioration of radio wave propagation environments is detected from a remaining data amount of a buffer. As a result, it is possible to control a wireless transmitting/receiving unit (for example, to switch between antennas) at an appropriate timing.

BRIEF DESCRIPTION OF DRAWINGS

FIG. 14 is a block diagram of a wireless transmission device that controls antennas using a maximum ratio combining method.

DETAILED DESCRIPTION OF INVENTION

First Embodiment

Figure 1:
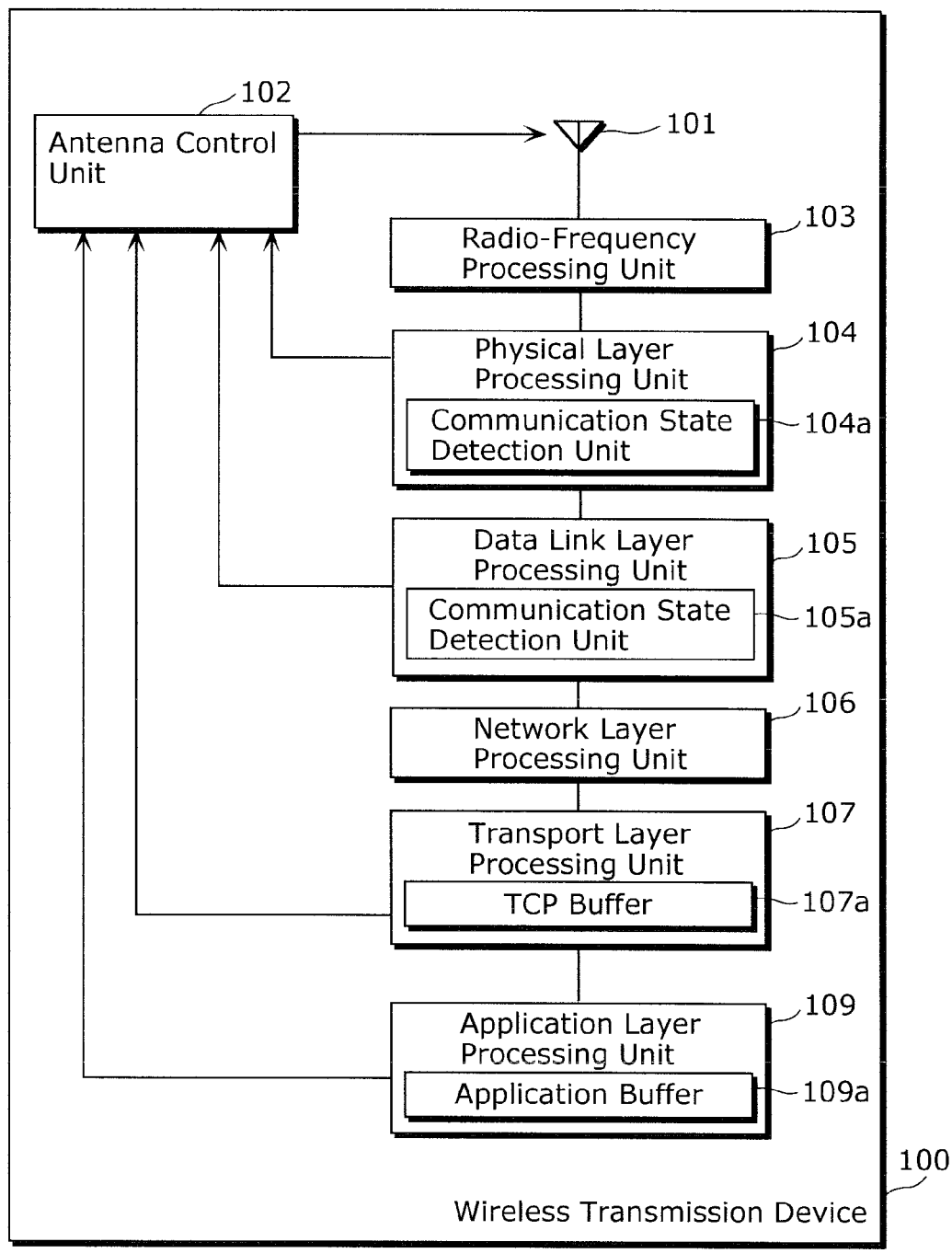
FIG. 1 is a block diagram of a wireless transmission device according to a first embodiment of the present invention.

FIG. 1 is a block diagram of a wireless transmission device 100 according to the first embodiment of the present invention. As shown in FIG. 1, the wireless transmission device 100 includes an antenna 101, an antenna control unit 102, a radio-frequency processing unit 103, a physical layer processing unit 104, a data link layer processing unit 105, a network layer processing unit 106, a transport layer processing unit 107, and an application layer processing unit 109. Here, the antenna 101 and the radio-frequency processing unit 103 are included in a wireless transmitting/receiving unit (not shown). A structure of the wireless transmitting/receiving unit will be described in detail later.

In the first embodiment, the situation where an antenna is controlled by monitoring a remaining data amount in a buffer in the transport layer.

In FIG. 1, the radio-frequency processing unit 103 converts radio-frequency signals received by the controllable antenna 101 into baseband signals. Moreover, the radio-frequency processing unit 103 converts baseband signals provided from the physical layer processing unit 104 into radio-frequency signals, and provides the resulting radio-frequency signals to the antenna 101. Here, the processing blocks from the physical layer processing unit 104 to the application layer processing unit 109 are standardized by a seven-layer model of OSI.

In packet communication via the Internet, protocols (TCP/IP protocols) of the five layers including the physical layer, the data link layer, the network layer, the transport layer, and the application layer among the seven-layers are often used.

In FIG. 1, each of the physical layer processing unit 104, the data link layer processing unit 105, the network layer processing unit 106, the transport layer processing unit 107, and the application layer processing unit 109 performs protocol processing for a corresponding layer.

The physical layer processing unit 104 includes a communication state detection unit 104a. The communication state detection unit 104a detects a communication state of the antenna 101. More specifically, the communication state detection unit 104a measures a Received Signal Strength Indicator (RSSI), a Signal to Noise power Ratio (SNR), and the like.

The data link layer processing unit 105 includes a communication state detection unit 105a. More specifically, the communication state detection unit 105a measures a Packet Error Rate (PER), a Bit Error Rate (BER), and the like of data received by the antenna 101.

As described above, the physical layer processing unit 104 includes the communication state detection unit 104a, and the data link layer processing unit 105 includes the communication state detection unit 105a. Although both the communication state detection units 104a and 105a output information to be used to detect a current communication state, they measure different data items as described above.

The network layer processing unit 106 sets a transmission destination of data to be transmitted from the antenna 101. In addition, the network layer processing unit 106 determines whether or not a destination of data received by the antenna 101 is the wireless transmission device 100 itself.

The transport layer processing unit 107 includes a TCP buffer 107a. The TCP buffer 107a temporarily holds TCP packets (referred to also as "TCP segments") received by the antenna 101, or TCP packets to be transmitted from the antenna 101.

The application layer processing unit 109 includes an application buffer 109a. The application buffer 109a is a buffer for an application to be executed on the wireless transmission device 100. The application buffer 109a temporarily holds data received by the antenna 101 to be used by the application, and data generated by the application to be transmitted from the antenna 101.

The antenna control unit 102 controls the wireless transmitting/receiving unit to improve communication quality of the antenna 101, in consideration of a part or all of pieces of information provided from the physical layer processing unit 104, the data link layer processing unit 105, the transport layer processing unit 107, and the application layer processing unit 109.

For example, the antenna control unit 102 detects a data amount stored in the TCP buffer 107a. Then, the antenna control unit 102 may start controlling the wireless transmitting/receiving unit when the data amount of the TCP buffer 107a falls below a predetermined threshold value.

Here, for a method of detecting the data amount stored in the TCP buffer 107a, it is possible, for example, to obtain a window size included in an ACKnowledgement packet (ACK packet) to be transmitted from the antenna 101, and subtract the window size from a capacity of the TCP buffer 107a.

In addition, for a method of calculating the threshold value, it is possible, for example, to obtain an application rate that is a data processing amount per unit time from the application layer processing unit 109, and thereby multiplies the application rate by a necessary time period required to control the antenna 101.

Figure 2:
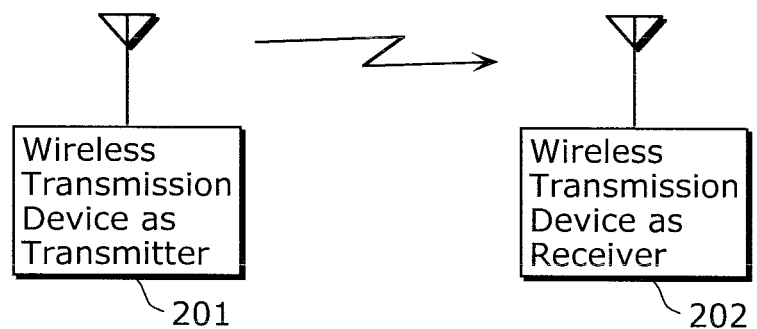
FIG. 2 is a schematic diagram of a plurality of the wireless transmission devices connected to each other via a wireless network.

FIG. 2 is a schematic diagram of a plurality of the wireless transmission devices connected to each other via a wireless network according to the first embodiment of the present invention. Although FIG. 2 shows communication between two wireless transmission devices, the present invention can be implemented as a wireless communication system including three or more wireless transmission devices at least one of which has a controllable antenna.

In the present invention, the processing of the antenna control method according to the first embodiment is described with reference to an example where a wireless transmission device as receiver 202 having the processing blocks and the controllable antenna shown in FIG. 1 receives video data packets from a wireless transmission device as transmitter 201 in a format compliant with the standard of the Institute of Electrical and Electronics Engineers (IEEE) 802.11, by using the Transmission Control Protocol (TCP) as a protocol for the transport layer and the Internet Protocol (IP) as a protocol for the network layer.

Data packets transmitted from the wireless transmission device as transmitter 201 to the wireless transmission device as receiver 202 are received by the antenna 101 of the wireless transmission device as receiver 202 and then provided to the radio-frequency processing unit 103 of the wireless transmission device as receiver 202. The radio-frequency processing unit 103 converts radio-frequency signals into baseband signals by using a wave detector or the like. After that, the received signals converted to the baseband signals are provided to the physical layer processing unit 104.

Figure 3:
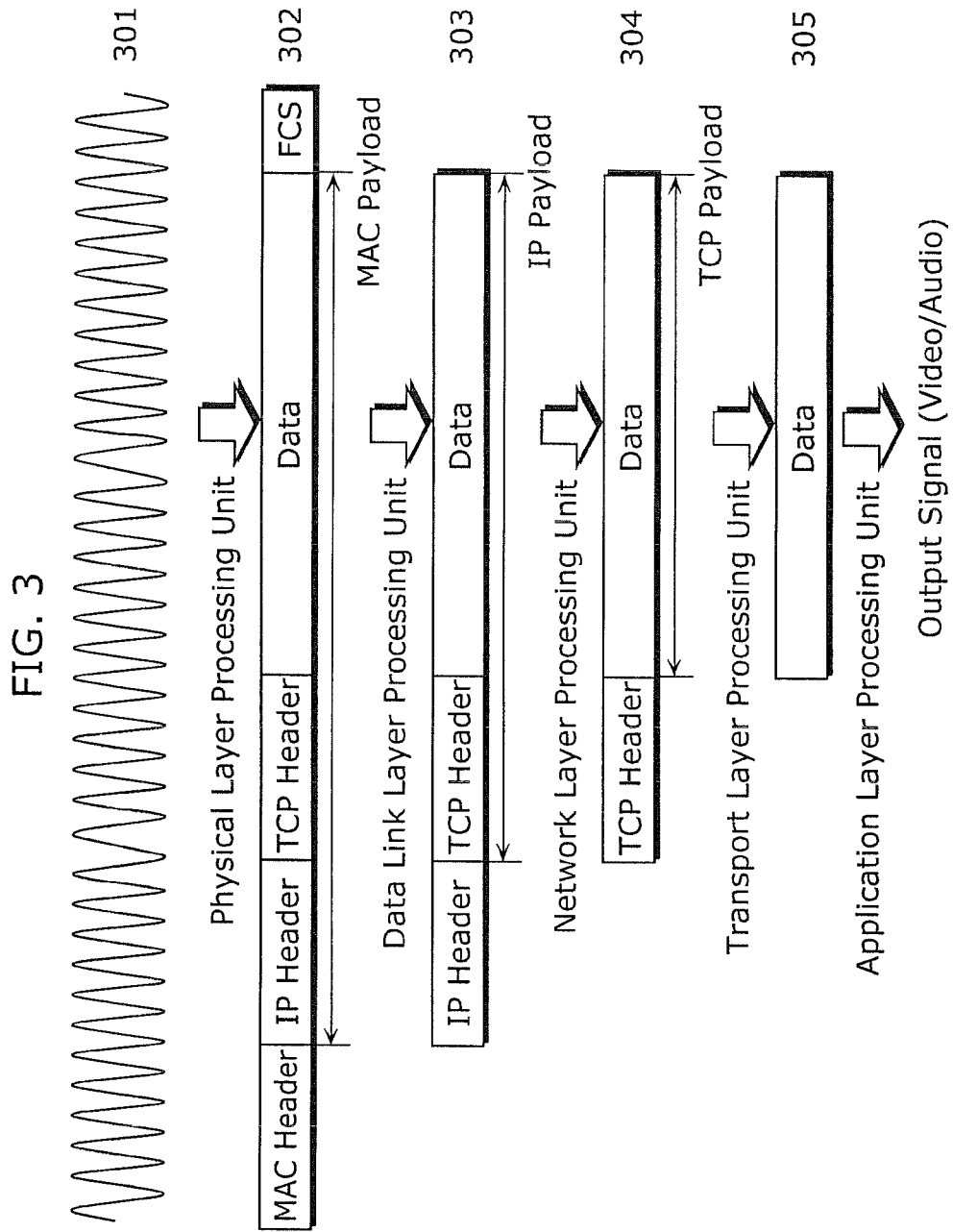
FIG. 3 is a schematic diagram of packet processing according to the first embodiment of the present invention.

FIG. 3 is a schematic diagram of packet processing performed by each of the layer processing units according to the first embodiment. The physical layer processing unit 104, which performs processing for the first layer, demodulates the baseband signals 301 provided from the radio-frequency processing unit 103 in order to generate a MAC packet (referred to also as a "MAC frame") 302 expressed by "0" and "1". The MAC packet 302 is provided to the data link layer processing unit 105.

Here, the antenna control unit 102 can obtain, from the physical layer processing unit 104, information such as RSSI and SNR of the received signals.

The data link layer processing unit 105 controls wireless transmission access in a Media Access Control (MAC) sublayer in order to generate an IP packet 303 that is the MAC packet 302 from which a MAC header is eliminated. The IP packet 303 is provided to the network layer processing unit 106.

The data link layer processing unit 105 detects errors by checking a Frame Check Sequence (FCS) added to the end of the MAC packet 302. As a result, the antenna control unit 102 can obtain, from the data link layer processing unit 105, information such as PER and BER in the MAC sublayer.

For the IP packet 303 provided to the network layer processing unit 106, route search on the network, packet division, and packet reconstruction are performed based on information in the IP header added to the IP packet 303. The data sequence addressed to the wireless transmission device as receiver 202 is provided, as a TCP packet 304 without the IP header, to the transport layer processing unit 107.

When the provided TCP packet 304 does not have any error, the transport layer processing unit 107 eliminates the TCP header from the TCP packet 304 in order to generate data 305, and temporarily stores the generated data 305 into the TCP buffer 107a. Then, the transport layer processing unit 107 transmits an ACKnowledgement (ACK) packet back to the wireless transmission device as transmitter 201. The data 305 temporarily stored in the TCP buffer 107a is retrieved as needed, to be provided to the application layer processing unit 109.

Signal processing is performed on the data 305 provided to the application layer processing unit 109, and thereby reproduced as video data, for example. In the TCP protocol, as described above, an ACK packet is transmitted in response to a received data packet, the data packet is re-transmitted when the ACK packet is not transmitted back, and the received data is temporarily stored in a buffer. Thereby, the influence of fluctuation on a transmission path can be reduced. As a result, the TCP protocol realizes transmission having a high reliability and a high stability.

Figure 4:
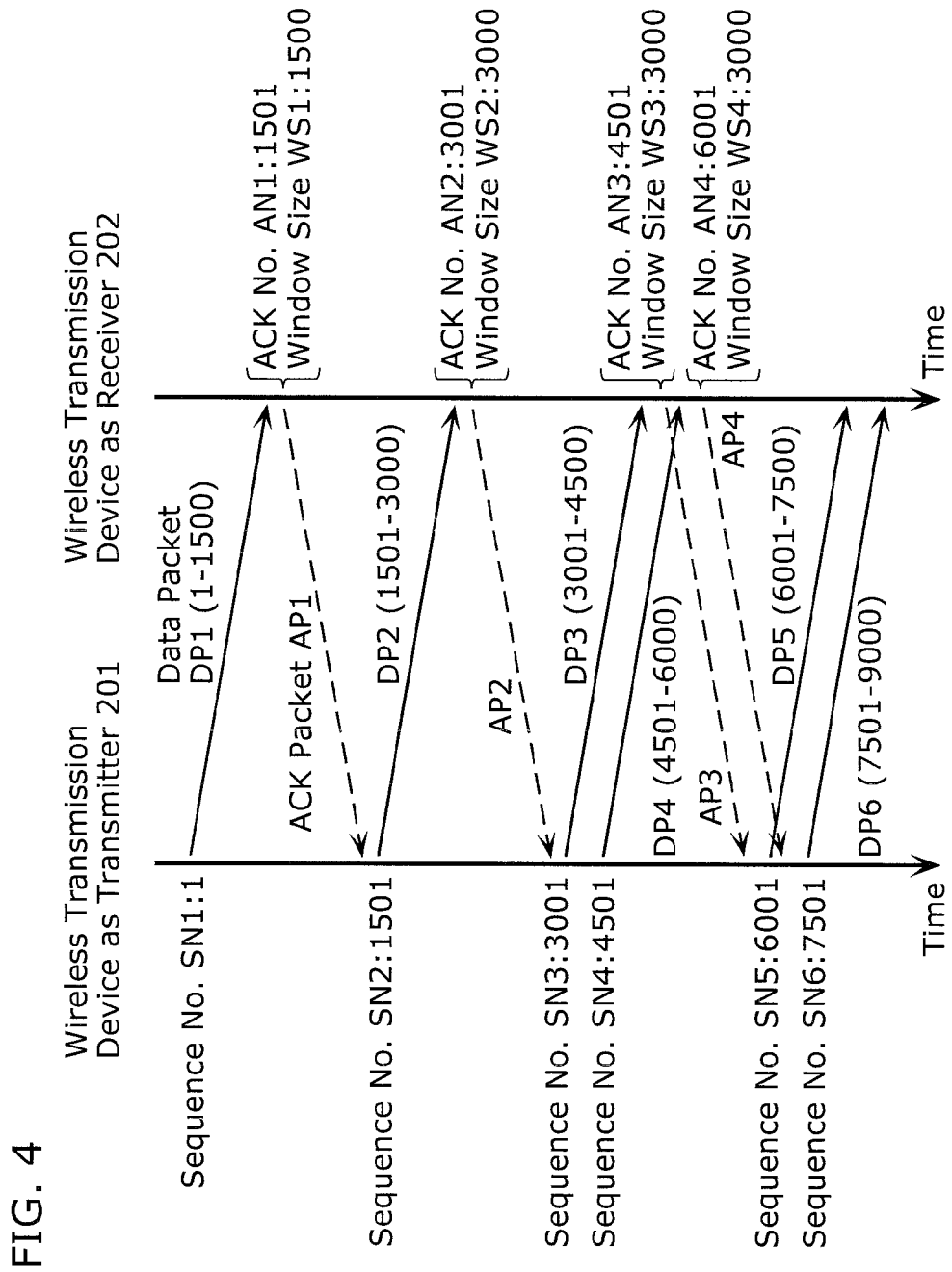
FIG. 4 is a schematic diagram of packet transmission in TCP protocol.
Figure 5:
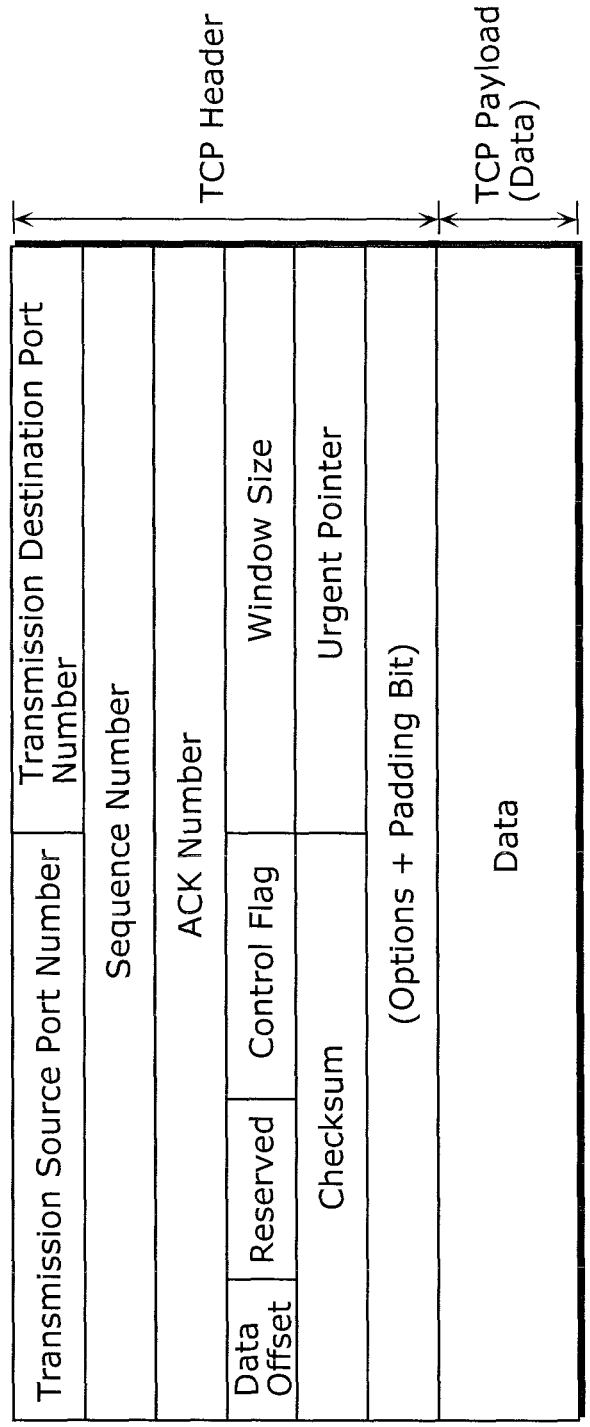
FIG. 5 is a diagram showing a frame format of a TCP packet.

FIG. 4 is a schematic diagram of packet transmission in the TCP protocol. FIG. 5 shows a frame format of the TCP packet 304. As shown in FIG. 5, the TCP header in the TCP packet 304 includes: a transmission source port number and a transmission destination port number which are used to identify an application or service; a sequence number that represents where data stored in the packet is used to be in original data; an ACKnowledgement (ACK) number that represents a number of a data packet to be transmitted next; a window size (the number of bytes) that represents a receivable data size; and the like.

The following describes packet transmission in the TCP protocol with reference to FIGS. 4 and 5. Hereinafter, a TCP packet including data to be processed by the application layer processing unit 109 is referred to as a "data packet (DP)", and a TCP packet notifying a communication partner of receipt of a data packet is referred to as an "ACK packet (AP)".

The sequence number, which is included in a TCP header of a data packet DP1 transmitted from the wireless transmission device as transmitter 201, is assigned with a sequence number indicating that the data packet DP1 is the first portion of the data to be transmitted. It is assumed that the data packet DP1 in FIG. 4 has a sequence number SN1 of 1. When the wireless transmission device as receiver 202 can receive the data packet DP1 (here, packets of the data to be transmitted are assigned with sequence numbers 1 to 1500, respectively) without error, the wireless transmission device as receiver 202 transmits an ACK packet AP1 back to the wireless transmission device as transmitter 201. An ACK number AN1 in a TCP header in the ACK packet AP1 is assigned with a sequence number (1500+1=1501 in the example of FIG. 4) of data to be received next. A window size WS1 is assigned with a receivable data size (1500 bytes in this example). Both the ACK number AN1 and the window size WS1 are assigned to be notified to the wireless transmission device as transmitter 201. Then, exchange of a data packet and an ACK packet is repeated.

Here, a window size assigned to an ACK packet represents an available capacity of the TCP buffer 107a of the wireless transmission device as receiver 202. For example, if a value (3000 bytes in this example) larger than one packet size, such as a window size WS2 of an ACK packet AP2, is transmitted back to the wireless transmission device as transmitter 201, then the wireless transmission device as transmitter 201 can transmit a data packet DP4 (having a data size of 1500 bytes) without waiting for an ACK packet AP3 in response to a data packet DP3 (having a data size of 1500 bytes).

The antenna control unit 102 obtains the window size of the ACK packet from the transport layer processing unit 107, and thereby monitors a remaining data amount in the TCP buffer 107a. When a remaining data amount in the TCP buffer 107a is decreased, it means that a transmission rate is lower than an application rate. If so, the antenna control unit 102 determines that the radio wave propagation environments are changed from before, and therefore starts controlling the antenna 101.

Figure 6:
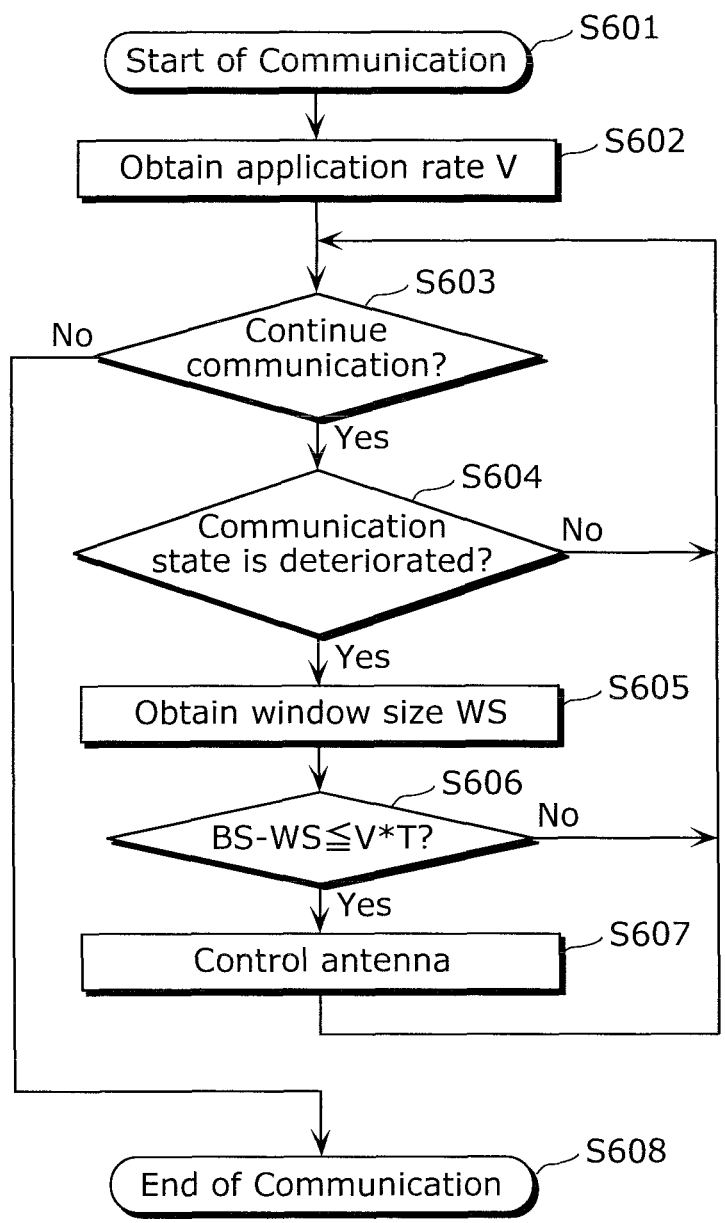
FIG. 6 is a flowchart of processing performed by an antenna control unit according to the first embodiment of the present invention.

FIG. 6 is a flowchart of processing performed by the antenna control unit 102 in the wireless transmission device as receiver 202 shown in FIG. 2.

The following describes processing performed by the antenna control unit 102 in detail with reference to FIG. 6.

The antenna control unit 102 previously holds: a total capacity BS (bytes) of the TCP buffer 107a; and a necessary time period T (seconds, where T>0) required from start of controlling the antenna 101 to determination of a new state of the antenna 101. Here, while the wireless transmission device as receiver 202 waits for a packet addresses to the wireless transmission device as receiver 202, the antenna control unit 102 causes characteristics of the antenna 101 to have a specific initial state.

When communication with the wireless transmission device as transmitter 201 starts (Step S601), the antenna control unit 102 obtains information related to an application rate V (bit/second, for example) from the application layer processing unit 109 (Step S602). The application rate V represents a data amount processed per unit time by an application (not shown) belonging to the application layer processing unit 109. An example of the application rate V is a video data compression method.

Next, while the communication continues (Yes at Step S603), the antenna control unit 102 monitors communication states notified from the communication state detection units 104a and 105a (Step S604). Then, when any communication state falls below a predetermined reference value (Yes at Step S604), then the antenna control unit 102 obtains a window size WS (bytes) of an ACK packet generated by the transport layer processing unit 107 (Step S605). Then, by using a difference between the total capacity BS and the window size WS representing the available capacity, a data amount accumulated in the buffer 108 is calculated.

Here, it is assumed the worst situation where no data can be received during a time period from start of controlling the antenna 101 to determination of a new state of the antenna 101, due to fluctuation of the radio wave propagation environments. In the worst situation, upon the start of controlling the antenna 101, the TCP buffer 107a should hold at least data (V×T bytes) having an amount (threshold value) expressed by a result of multiplication of the application rate V by the necessary time period T required for the antenna control.

In other words, even if the radio wave propagation environments have great fluctuation, as long as the TCP buffer 107a always holds data amount expressed by the result of the multiplication of the application rate V by the necessary time period T required for the antenna control, the antenna 101 can be controlled to change its state, so that stable packet receiving and application reproduction can be continued.

Therefore, when a difference between the total capacity BS of the TCP buffer 107a and the window size WS falls below the result of the multiplication of the application rate V by the necessary time period T required for the antenna control, in other words, when (BS−WS)≤(V×T) (Yes at Step S606), then the antenna control unit 102 starts controlling the antenna 101 and determines a new state of the antenna 101 (Step S607).

Otherwise (No at Step S606), the antenna control unit 102 does not change the current state of the antenna 101, and waits for information of a window size WS of a next ACK packet. The above-described algorithm is repeated until the end of the communication (Steps S603 to S607).

In the above description, the expression "to control the antenna 101" means that the wireless transmitting/receiving unit is controlled to improve communication quality of the antenna 101. For example, it is possible to select one of a plurality of antennas having different directivities, or also possible to select one of a plurality of antennas arranged at different positions.

For example, in the above-described structure shown in FIG. 1, the controllable antenna 101 may be: a diversity antenna; an antenna having a directionality electrically varied by turning ON/OF parasitic elements arranged around the antenna (by switching conduction sates of the parasitic elements); an adaptive array antenna having a directionality varied by signal processing by changing a weighting coefficient; or any kind of antenna.

It is also possible that there are a plurality of the antennas 101. The present invention can be applied to wireless transmission devices using a Multiple Input-Multiple Output (MIMO) transmission method. Furthermore, an output of the antenna control unit 102 may be any signals as long as they are compliant with the method of controlling the controllable antenna 101.

Figure 7:
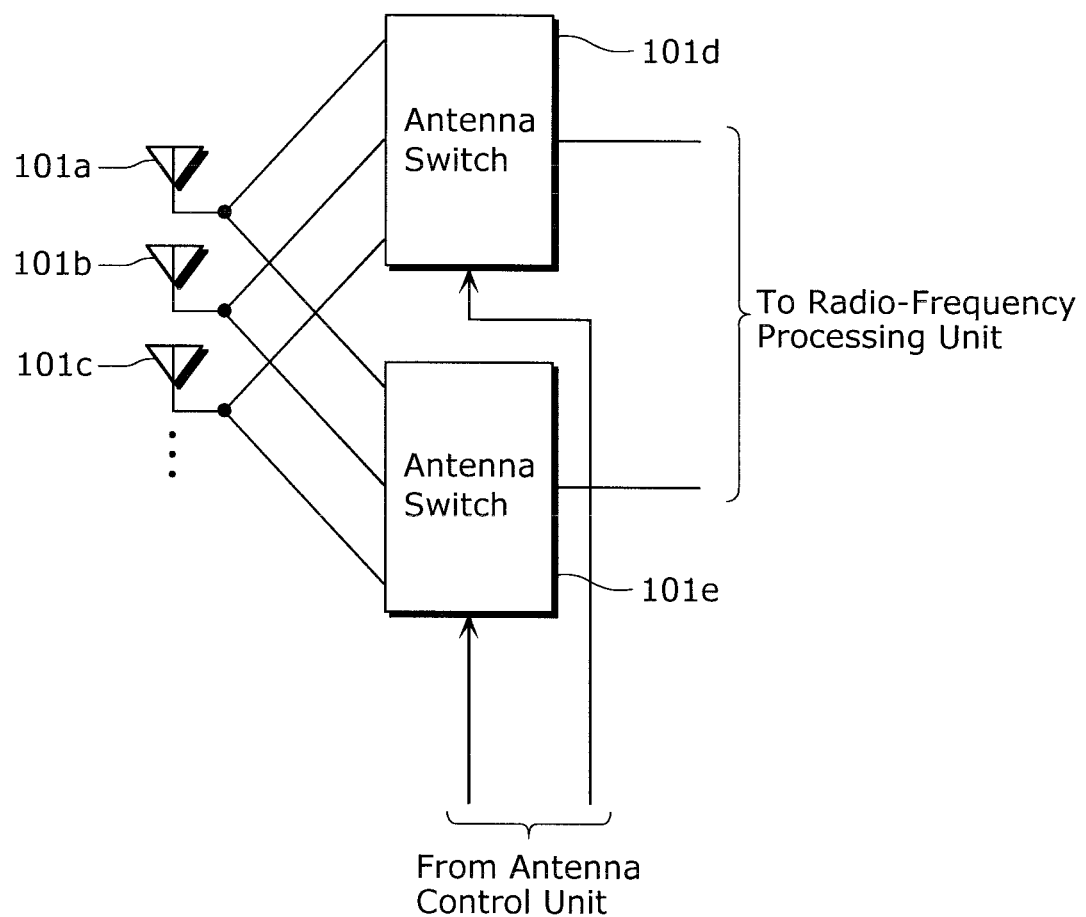
FIG. 7 is a block diagram showing an example of a wireless transmitting/receiving unit according to the present invention.
Figure 8:
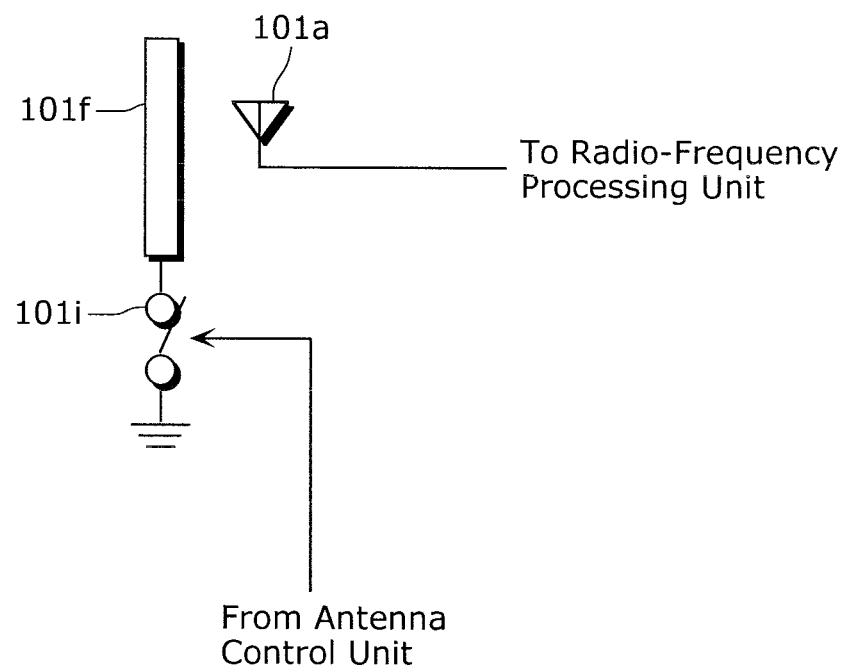
FIG. 8 is a block diagram showing another example of the wireless transmitting/receiving unit according to the present invention.
Figure 9:
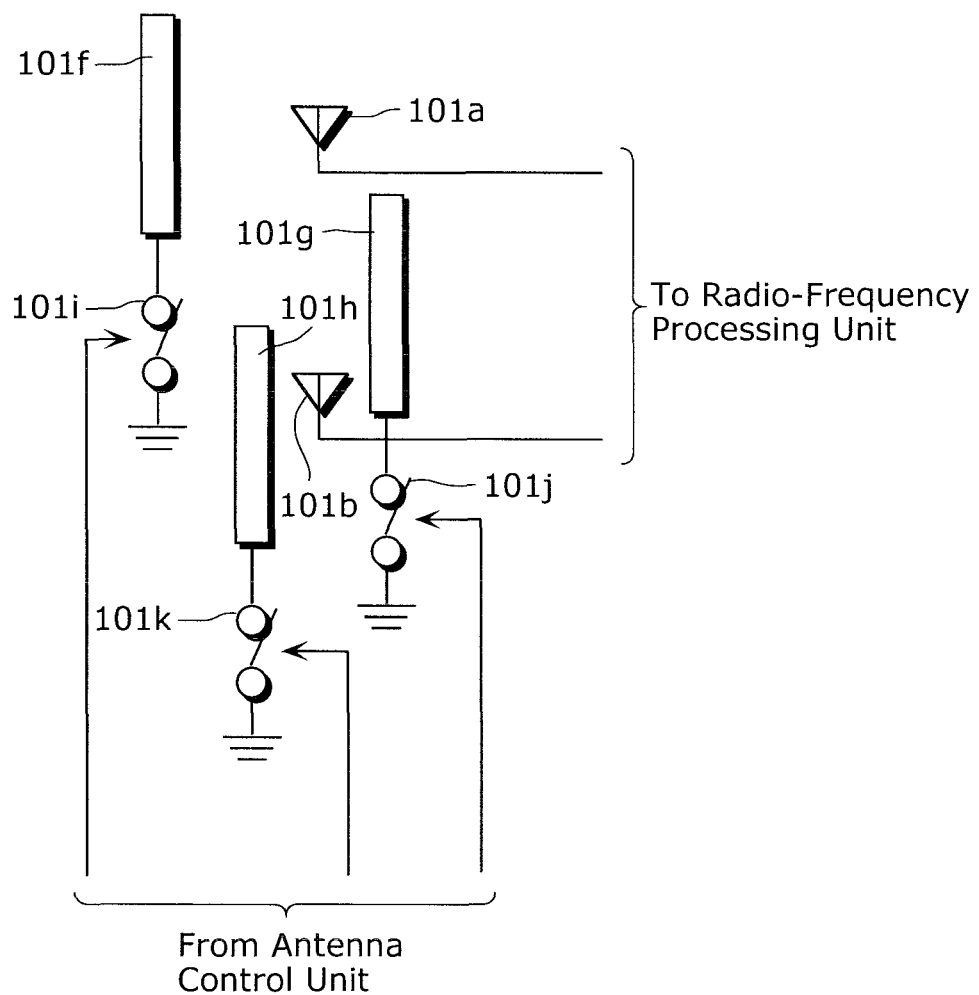
FIG. 9 is a block diagram showing still another example of the wireless transmitting/receiving unit according to the present invention.

Each of FIGS. 7 to 9 is a diagram showing an example of the wireless transmitting/receiving unit having variable directivities, The wireless transmitting/receiving unit shown in FIG. 7 includes a plurality of antennas 101a, 101b, and 101c, and a plurality of antenna switches 101d and 101e. As shown in FIG. 7, the provision of the antenna switches 101d and 101e makes it possible to select a combination from among the antennas 101a, 101b, and 101c to be connected to the radio-frequency processing unit 103. The above structure can be compliant with the MIMO wireless transmission method.

In the above case, it is also possible that the antenna control unit 102 controls the antenna switches 101d and 101e to sequentially change a combination from among the antennas in order to test communication for each combination, and the antenna control unit 102 thereby select an optimum combination having the highest communication quality.

The wireless transmitting/receiving unit shown in FIG. 8 includes a single antenna 101a, a parasitic element 101f, and a switch 101i. As shown in FIG. 8, the parasitic element 101f is provided close to the antenna 101a, and the switch 101i changes a grounding state of the parasitic element 101f to change directivities. The above structure can produce the same effects as those in the case where one antenna is selected from a plurality of antennas having different directivities.

A wireless transmitting/receiving unit shown in FIG. 9 includes a plurality of antennas 101a and 101b, a plurality of parasitic elements 101f, 101g, and 101h, and a plurality of switches 101i, 101j, and 101k. As shown in FIG. 9, the parasitic elements 101f, 101g, and 101h are provided close to the antennas 101a and 101b (the number of the antennas may be equal to or different from the number of the parasitic elements), and the switches 101i, 101j, and 101k change grounding states of the parasitic elements 101f, 101g, and 101h, respectively, to change directivities. The above structure can produce the same effects as those in the case where an antenna is switched to another. This structure can be compliant with the MIMO wireless transmission method.

It should be noted that it has been described in the first embodiment that the antenna control unit 102 performs the determination as to whether antenna control is necessary, based on (a) the detection results of the communication state detection units 104a and 105a, and (b) the remaining data amount accumulated in the TCP buffer 107a. However, the determination basis is not limited to the above. For example, the antenna control unit 102 can make the determination based only on the remaining data amount accumulated in the TCP buffer 107a. Or, it is also possible to use a remaining data amount accumulated in the application buffer 109a, not in the TCP buffer 107a.

It should also be noted that it has been described in the example of the first embodiment that the threshold value is calculated by multiplying the application rate V by the necessary time period T required for the antenna control. However, the above example has a possibility that video data or the like is discontinued when the antenna control takes a time more than expected. In order to prevent the problem, the above threshold value is further multiplied by a coefficient (for example, a coefficient selected from a range between 1.05 to 1.2), so that more stable data transmission can be achieved.

Furthermore, when a plurality of applications are executed in parallel, it is also possible to monitor their application rates V always not only at start of communication.

Moreover, a method of transmitting back an ACK packet depends on implementation of the wireless transmission device. The present invention can be applied even to a method of transmitting a single ACK packet in response to a plurality of data packets, because it is possible to refer to a window size.

Thus, with the above structure, fluctuation of the radio wave propagation environments is detected by using a remaining data amount in a buffer of the transport layer or the application layer. As a result, by using data in the buffer, it is possible to reduce variation caused by instant fluctuation of radio wave propagation. On the other hand, if it is determined that the radio wave propagation environments are greatly fluctuated due to considerable reduction of the remaining data amount, deterioration of transmission characteristics is prevented by performing antenna control which is not necessary in the case of instant radio wave propagation fluctuation. Moreover, the antenna control is performed while the buffer always holds a data amount enough to prevent video discontinuity until completion of the antenna control. As a result, it is possible to achieve more stable transmission of the video data in the TCP protocol.

Second Embodiment

In the second embodiment, it is described the situation where antenna control is performed based on at least one of (a) header information of an ACK packet in the transport layer and (b) time out of transmission of the ACK packet.

In the second embodiment, the structure of the wireless transmission device as receiver 202 and the processing flowchart of the antenna control unit 102 are the same as those described in the first embodiment, and therefore they are not described again in the second embodiment.

Figure 10:
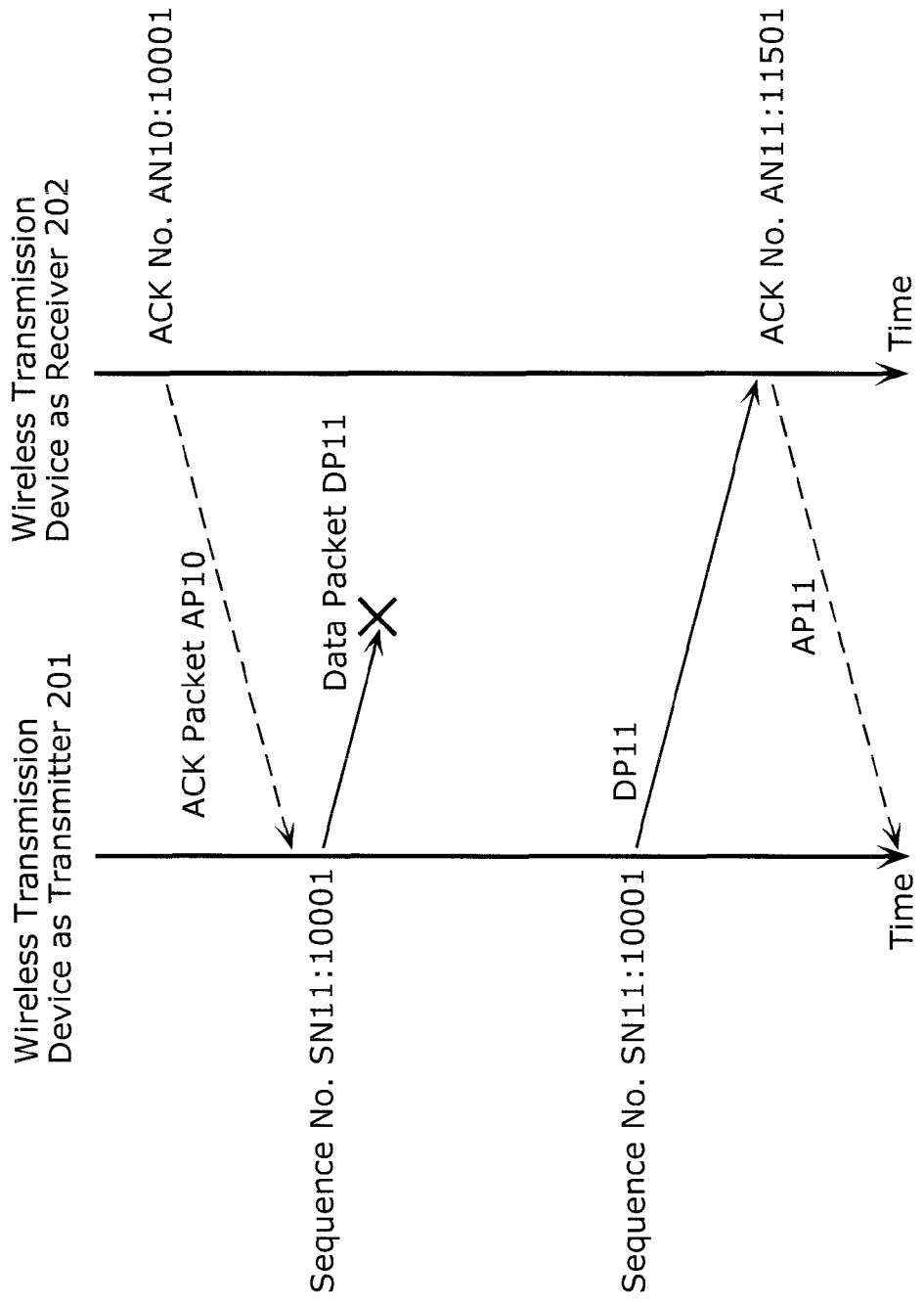
FIG. 10 is a schematic diagram of an example of packet transmission in TCP protocol according to a second embodiment of the present invention.

FIG. 10 shows an example of a situation where an error occurs in receiving a data packet in packet transmission using the TCP protocol. Here, it is mainly assumed that data processed by an application is divided into a plurality of data packets and then transmitted in the same manner as in video stream distribution.

As shown in FIG. 10, when an error occurs in receiving a data packet DP11 by the wireless transmission device as receiver 202, the transport layer processing unit 107 of the wireless transmission device as receiver 202 does not transmit an ACK packet back to the wireless transmission device as transmitter 201. The wireless transmission device as transmitter 201 detects transmission time-out of an ACK packet, and re-transmits the data packet DP11.

The antenna control unit 102 of the wireless transmission device as receiver 202 obtains, from the application layer processing unit 109, information indicating whether or not the last received data packet (DP11) is a final data packet. Moreover, every time an ACK packet is transmitted from the antenna 101, the antenna control unit 102 of the wireless transmission device as receiver 202 obtains header information of the ACK packet from the transport layer processing unit 107.

Here, if the antenna control unit 102 cannot obtain header information of an ACK packet from the transport layer processing unit 107 during a certain time period even in the middle of receiving data (here, the last received data packet is assumed not to be a final data packet), then the antenna control unit 102 determines that the state of the antenna receiving data has a problem. Then, the antenna control unit 102 controls the antenna 101 to be in a different state when receiving data, and to be kept in the current state when transmitting data.

The antenna control unit 102 can detect a timing of switching between a transmitting mode and a receiving mode from a transmitting enable signal or a receiving enable signal provided from the physical layer processing unit 104 or the data link layer processing unit 105. It is therefore possible to change the state of the antenna depending on whether the antenna is transmitting or receiving data. In typical processing, the physical layer processing unit 104 (or the data link layer processing unit 105) always outputs a receiving enable signal, and outputs a transmitting enable signal instead of a receiving enable signal only when data to be transmitted is provided from an upper layer processing unit (the transport layer processing unit 107, the application layer processing unit 109, or the like).

Figure 11:
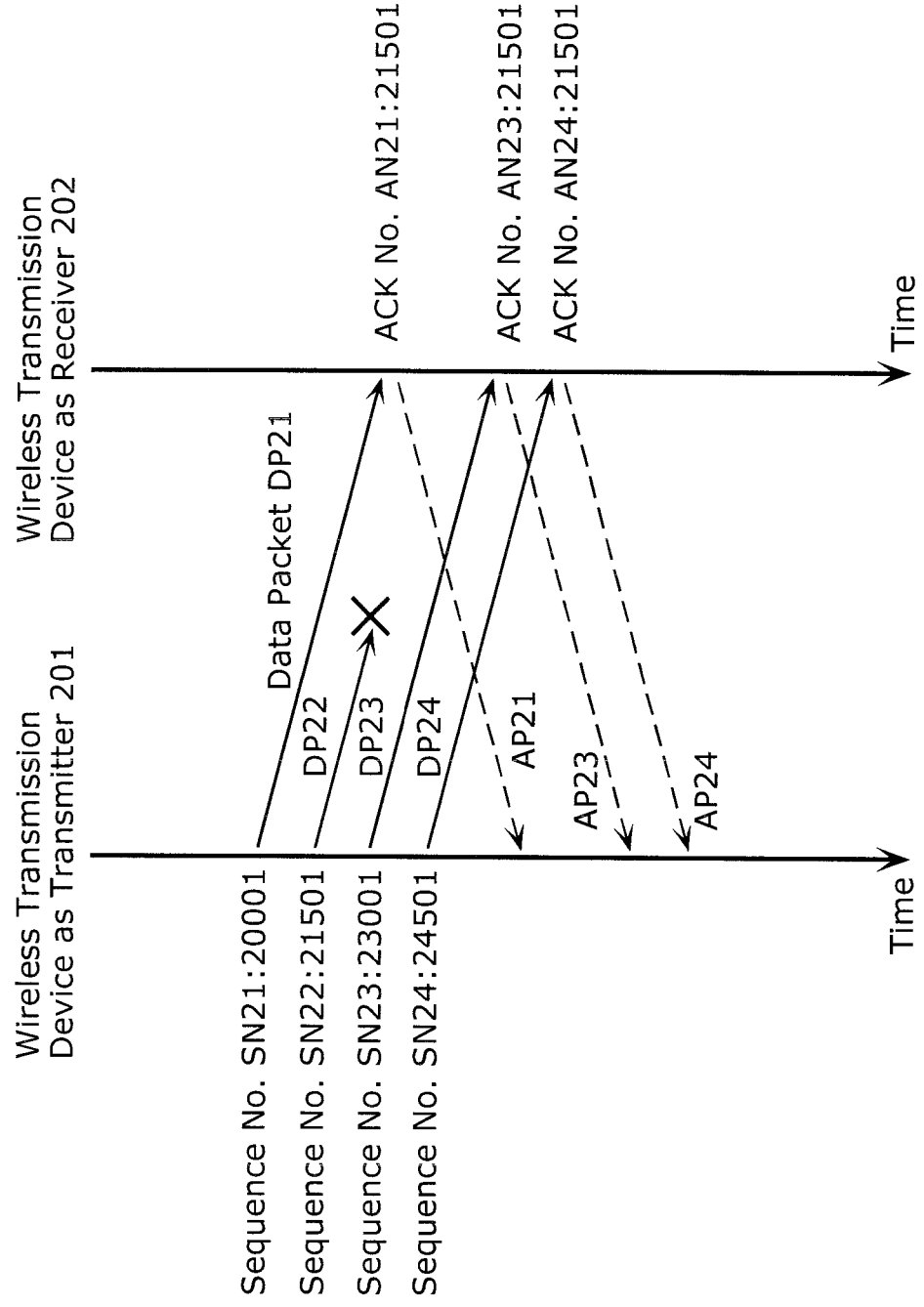
FIG. 11 is a schematic diagram of another example of packet transmission in TCP protocol.

FIG. 11 shows another example of a situation where an error occurs in receiving a data packet in packet transmission using the TCP protocol. It is assumed that an error occurs in receiving a data packet DP22 in the wireless transmission device as receiver 202. Here, even if the wireless transmission device as receiver 202 can receive subsequent data packets DP23 and DP24, both ACK numbers AN23 and AN24 of ACK packets AP23 and AP24 in response to the data packets DP23 and DP24, respectively, are to be assigned with a value of a sequence number SN22 (21501 in the example of FIG. 11) of the data packet DP22 having the reception error.

Since the values of the ACK numbers of ACK packets which are obtained from the transport layer processing unit 107 are identical, the wireless transmission device as receiver 202 detects that there is a problem in the data transmission. For example, if the wireless transmission device as transmitter 201 is informed of a large window size, the wireless transmission device as transmitter 201 transmits data having the window size regardless of whether or not the data packet DP22 is correctly transmitted.

Therefore, the antenna control unit 102 of the wireless transmission device as receiver 202 determines that there is a problem in the state of the antenna receiving data, when correctly-received N data packets (where N is an integer of 2 or more) have respective different sequence numbers (20001, 23001, and 24501, in the example of FIG. 11) but ACK packets for these data packets are assigned with the identical values. Then, the antenna control unit 102 of the wireless transmission device as receiver 202 controls the antenna to be in a different state when receiving data, and to be kept in the current state when transmitting data.

Figure 12:
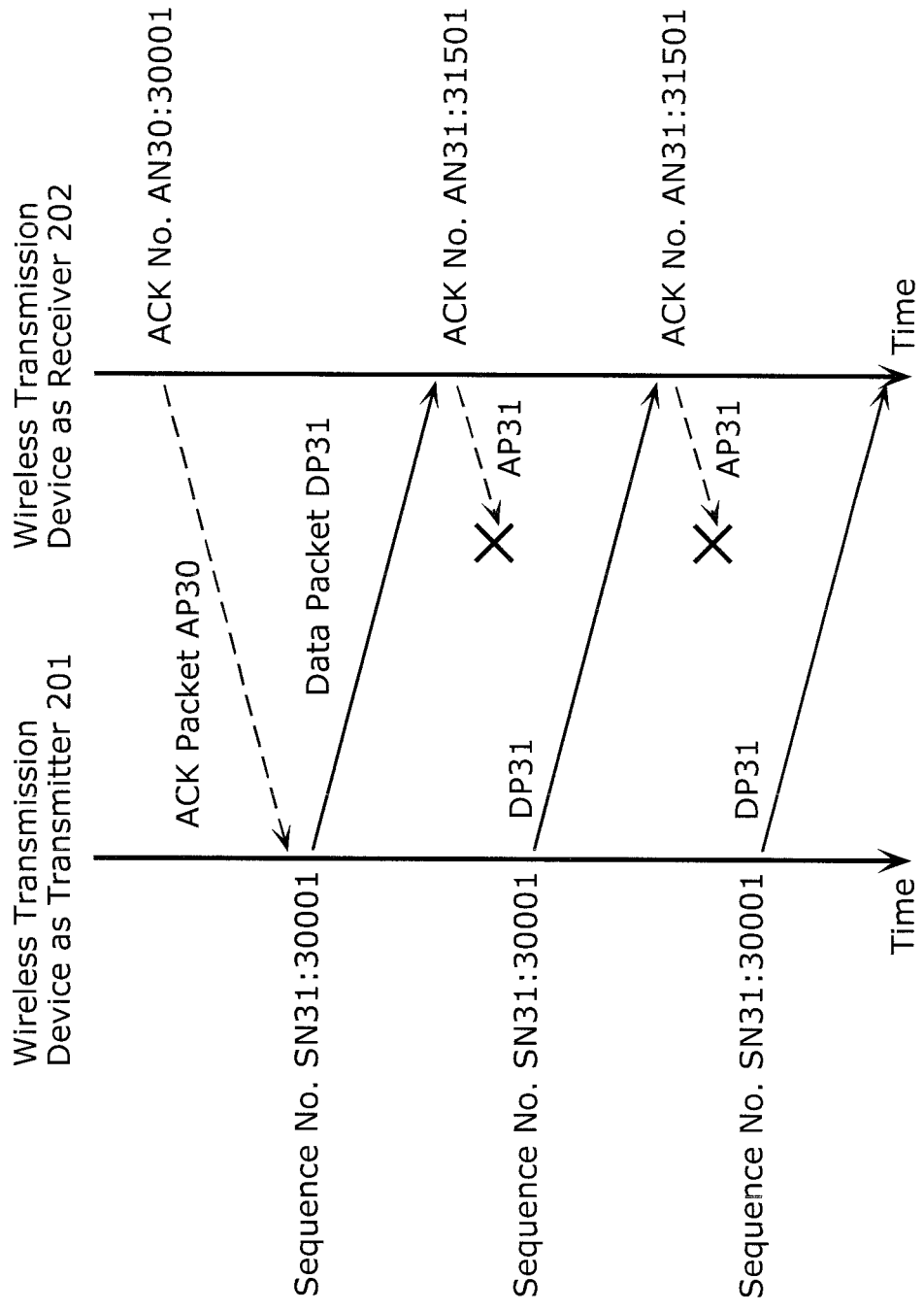
FIG. 12 is a schematic diagram of still another example of packet transmission in TCP protocol.
Figure 13:
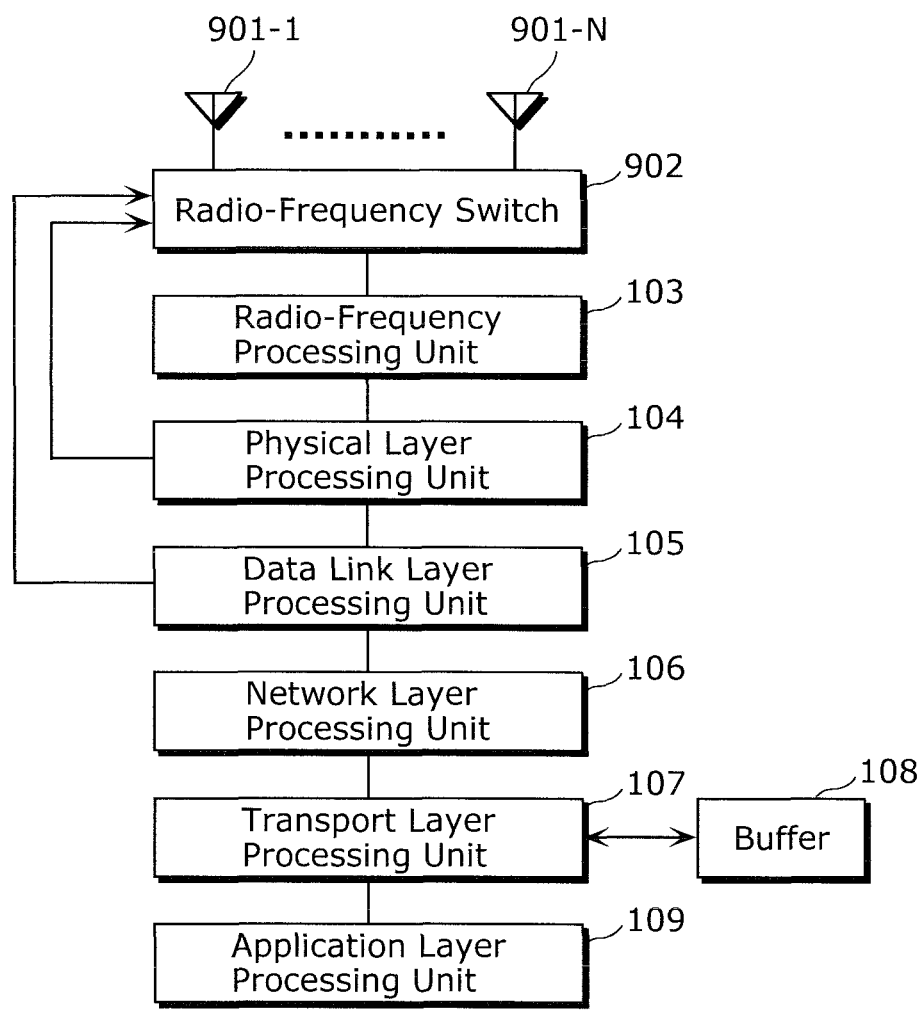
FIG. 13 is a block diagram of a wireless transmission device that controls antennas using a spatial diversity method according to a conventional technology.

On the other hand, FIG. 12 shows an example of a situation where an error occurs in transmitting an ACK packet in packet transmission using the TCP protocol. When the wireless transmission device as receiver 202 correctly completes receiving of the data packet DP31, the wireless transmission device as receiver 202 transmits an ACK packet AP31 back to the wireless transmission device as transmitter 201 in response to the data packet DP31. However, if the wireless transmission device as transmitter 201 cannot correctly receive the ACK packet due to any cause, the wireless transmission device as transmitter 201 re-transmits the data packet DP31. When it is difficult to transmit data from the wireless transmission device as receiver 202 to the wireless transmission device as transmitter 201, the above processing is repeated.

Likewise the situation having a problem in receiving data from the wireless transmission device as transmitter 201, the wireless transmission device as receiver 202 can detect that there is a problem in data transmission because ACK numbers of ACK packets which are obtained from the transport layer processing unit 107 are identical. Here, correctly-received N data packets (where N is an integer of 2 or more) have sequence numbers having identical values (31501 in the example of FIG. 12), and ACK numbers of ACK packets for these data packets are assigned with identical values. Therefore, it is determined that there is a problem in the state of the antenna transmitting an ACK packet. Then, the wireless transmission device as receiver 202 controls its antenna to be in a different state when transmitting data, and to be kept in the current state when receiving data.

As described above, the wireless transmission device according to the second embodiment can determine whether a problem occurs in packet transmitting or in packet receiving. It is therefore possible to change the state of the antenna depending on whether the antenna is transmitting or receiving data. As a result, more stable data transmission can be achieved.

It should be noted in the present invention that TCP is used as a protocol for the transport layer, IP is used as a protocol for the network layer, and a format is compliant with the IEEE 802.11 standard, but different protocols and standard may be used.

It should also be noted that it has been described in the first embodiment that the antenna 101 is controlled based on a state of the TCP buffer 107a in the transport layer. However, it is also possible to control the antenna 101 based on a state (remaining data amount) of the application buffer 109a that temporarily holds data in the application layer.

It should also be noted that an application for executing video streaming, which is installed in a home appliance or a personal computer connected to a network, generally starts reproduction of video contents after storing a certain amount of data into an application buffer, when a user instructs the reproduction. In this case, a remaining data amount in the application buffer at start of reproduction is always monitored, and thereby an antenna can be controlled based on the monitoring results.

Other Variations

Although the present invention has been described in accordance with the above embodiments, the present invention is, of course, not limited to these embodiments. The following variations are also included in the present invention.

Each of the above devices according to the embodiments is a computer system including a microprocessor, a Read Only Memory (ROM), a Random Access Memory (RAM), a hard disk unit, a display unit, a keyboard, a mouse, and the like. The RAM or the hard disk unit holds a computer program. The microprocessor executes the computer program to cause each of the devices to perform its functions. Here, the computer program consists of combinations of instruction codes for issuing instructions to the computer to execute predetermined functions.

It should be noted that a part or all of the structural elements included in each of the devices according to the above embodiments may be implemented into a single Large Scale Integration (LSI). The system LSI is a super mufti-function LSI that is a single chip into which a plurality of structural elements are integrated. More specifically, the system LSI is a computer system including a microprocessor, a ROM, a RAM, and the like. The RAM holds a computer program. The microprocessor executes the computer program to cause the system LSI to perform its functions.

It should also be noted that a part or all of the structural elements included in each of the devices according to the above embodiments may be implemented into an Integrated Circuit (IC) card or a single module which is attachable to and removable from the device. The IC card or the module is a computer system including a microprocessor, a ROM, a RAM, and the like. The IC card or the module may include the above-described super mufti-function LSI. The microprocessor executes the computer program to cause the IC card or the module to perform its functions. The IC card or the module may have tamper resistance.

It should also be noted that the present invention may be the above-described method. The present invention may be a computer program causing a computer to execute the method, or digital signals indicating the computer program.

It should also be noted that the present invention may be a computer-readable recording medium on which the computer program or the digital signals are recorded. Examples of the computer-readable recording medium are a flexible disk, a hard disk, a Compact Disc (CD)-ROM, a magnetooptic disk (MO), a Digital Versatile Disc (DVD), a DVD-ROM, a DVD-RAM, a BD (Blu-ray® Disc), and a semiconductor memory. The present invention may be digital signals recorded on the recording medium.

It should also be noted in the present invention that the computer program or the digital signals may be transmitted via an electric communication line, a wired or wireless communication line, a network represented by the Internet, data broadcasting, and the like.

It should also be noted that the present invention may be a computer system including a microprocessor operating according to the computer program and a memory storing the computer program.

It should also be noted that the program or the digital signals may be recorded onto the recording medium to be transferred, or may be transmitted via a network or the like, so that the program or the digital signals can be executed by a different independent computer system.

It should also be noted that the above-described embodiments and their variations may be combined.

Although the embodiments according to the present invention have been described with reference to the drawings, the present invention is not limited to the embodiments illustrated in the drawings. The embodiments illustrated in the drawings may be modified and varied within the same meanings and the scope of the present invention.

The wireless transmission device according to the present invention is capable of performing stable transmitting/receiving of application data by controlling an antenna depending on fluctuation of radio wave propagation environments. Especially, the wireless transmission device is useful for devices that transfer and reproduce data such as video streams.

NUMERICAL REFERENCES 100 wireless transmission device
101, 101a, 101b, 101c, 901-1, 901-N antenna
101d, 101e antenna switch
101f, 101g, 101h parasitic element
101i, 101j, 101k switch
102 antenna control unit
103, 103-1, 103-N radio-frequency processing unit
104 physical layer processing unit
104a, 105a communication state detection unit
105 data link layer processing unit
106 network layer processing unit
107 transport layer processing unit
107a TCP buffer
108 buffer
109 application layer processing unit
109a application buffer
201 wireless transmission device as transmitter
202 wireless transmission device as receiver
301 baseband signal
302 MAC packet
303 IP packet
304 TCP packet
305 data
902 radio-frequency switch
1001 weighting synthesis unit
1002-1, 1002-N variable attenuator
1003-1, 1003-N variable phase shifter
1004 adder

The invention claimed is:

1. A wireless transmission device that performs wireless data transmission, the wireless transmission device comprising:

a wireless transmitting and receiving unit that includes an antenna that transmits and receives data wirelessly;

a buffer in which the data that is to be transmitted or has been received by the wireless transmitting and receiving unit is temporarily stored; and an antenna control unit configured to improve characteristics of the wireless transmitting and receiving unit by causing the wireless transmitting and receiving unit to perform one of the following when it is determined that a data amount stored in the buffer falls below a threshold value: (a) processing for selecting, as the antenna, one of a plurality of antennas each having a different directivity, (b) processing for changing the directivity of the antenna by switching a conduction state of a parasitic element arranged close to the antenna, and (c) processing for changing a weighting coefficient for an adaptive array antenna serving as the antenna, wherein the buffer is a Transmission Control Protocol (TCP) buffer in which a TCP packet received by the wireless transmitting and receiving unit is temporarily stored, the wireless transmitting and receiving unit is configured to transmit an ACKnowledgement (ACK) packet to a transmission source of the TCP packet in order to notify the transmission source that the wireless transmitting and receiving unit has received the TCP packet, the antenna control unit is configured to detect a data amount of the TCP buffer by subtracting a window size included in the ACK packet from a capacity of the TCP buffer, and the antenna control unit is configured to calculate the threshold value, by multiplying an application rate by a necessary time period, the application rate being a processing amount per unit time of the data received by the wireless transmitting and receiving unit, and the necessary time period being a time period required to improve the characteristics of the wireless transmitting and receiving unit.

2. A wireless transmission device that performs wireless data transmission, the wireless transmission device comprising:

a wireless transmitting and receiving unit that includes an antenna that transmits and receives data wirelessly;

a buffer in which the data that is to be transmitted or has been received by the wireless transmitting and receiving unit is temporarily stored; and an antenna control unit configured to improve characteristics of the wireless transmitting and receiving unit by causing the wireless transmitting and receiving unit to perform one of the following when it is determined that a data amount stored in the buffer falls below a threshold value: (a) processing for selecting, as the antenna, one of a plurality of antennas each having a different directivity, (b) processing for changing the directivity of the antenna by switching a conduction state of a parasitic element arranged close to the antenna, and (c) processing for changing a weighting coefficient for an adaptive array antenna serving as the antenna, wherein the antenna control unit is configured to, determine whether or not there is a problem in the antenna in transmitting data and in receiving data, based on header information of a Transmission Control Protocol (TCP) packet transmitted or received by the wireless transmitting and receiving unit, change the directivity of the antenna when a signal indicating that the antenna is transmitting data is received, in a case where it is determined that there is a problem in the antenna in transmitting data, and change the directivity of the antenna when a signal indicating that the antenna is receiving data is received, in a case where it is determined that there is a problem in the antenna in receiving data, and the antenna control unit is configured to improve the characteristics of the wireless transmitting and receiving unit receiving data, when the wireless transmitting and receiving unit transmits N pieces of ACKnowledgement (ACK) packets, where N is an integer of 2 or more, which have ACK numbers assigned with identical values for each of the ACK packets, in response to N pieces of TCP packets while the wireless transmitting and receiving unit is continuously receiving the N TCP packets included in single data which have TCP headers indicating sequence numbers assigned with different values for each of the TCP packets.

3. A wireless transmission device that performs wireless data transmission, the wireless transmission device comprising:

a wireless transmitting and receiving unit that includes an antenna that transmits and receives data wirelessly;

a buffer in which the data that is to be transmitted or has been received by the wireless transmitting and receiving unit is temporarily stored; and an antenna control unit configured to improve characteristics of the wireless transmitting and receiving unit by causing the wireless transmitting and receiving unit to perform one of the following when it is determined that a data amount stored in the buffer falls below a threshold value: (a) processing for selecting, as the antenna, one of a plurality of antennas each having a different directivity, (b) processing for changing the directivity of the antenna by switching a conduction state of a parasitic element arranged close to the antenna, and (c) processing for changing a weighting coefficient for an adaptive array antenna serving as the antenna, wherein the antenna control unit is configured to, determine whether or not there is a problem in the antenna in transmitting data and in receiving data, based on header information of a Transmission Control Protocol (TCP) packet transmitted or received by the wireless transmitting and receiving unit, change the directivity of the antenna when a signal indicating that the antenna is transmitting data is received, in a case where it is determined that there is a problem in the antenna in transmitting data, and change the directivity of the antenna when a signal indicating that the antenna is receiving data is received, in a case where it is determined that there is a problem in the antenna in receiving data, and wherein the antenna control unit is configured to improve the characteristics of the wireless transmitting and receiving unit transmitting data, when (i) the wireless transmitting and receiving unit continuously receives N TCP packets included in single data, where N is an integer of 2 or more, which have TCP headers indicating sequence numbers assigned with identical values for each of the TCP packets, and (ii) the wireless transmitting and receiving unit transmits N ACKnowledgement (ACK) packets having ACK numbers assigned with identical values in response to the N TCP packets for each of the ACK packets.

\* \* \* \* \*